United States Patent [19]

Birkner et al.

[11] Patent Number: 4,552,123
[45] Date of Patent: Nov. 12, 1985

[54] GAS-FIRED STEAM COOKER

[75] Inventors: Joseph R. Birkner, West Peabody; Maurice Nunes, Arlington; James R. Hurley, East Weymouth, all of Mass.

[73] Assignee: Thermo Electron Corporation, Waltham, Mass.

[21] Appl. No.: 681,033

[22] Filed: Dec. 12, 1984

[51] Int. Cl.$^4$ .......................... F24D 1/00; F28F 21/00
[52] U.S. Cl. .................................. 126/369; 126/391; 126/360 R; 126/20; 99/467; 165/180
[58] Field of Search .............. 126/369, 348, 20, 369.2, 126/391, 360 R; 99/467; 165/DIG. 25, 180, 183

[56] References Cited

U.S. PATENT DOCUMENTS

| | | | |
|---|---|---|---|
| 42,442 | 4/1864 | Martin | 126/20 |
| 1,252,926 | 1/1918 | Mueller | 126/369 |
| 2,712,308 | 7/1955 | Keating | 126/391 |
| 3,060,922 | 10/1962 | Wilson | 126/391 |
| 4,032,748 | 6/1977 | Vischer et al. | 165/180 X |
| 4,173,215 | 11/1979 | Bureau et al. | 126/369 |
| 4,263,878 | 4/1981 | Hurley et al. | 122/136 |
| 4,460,822 | 7/1984 | Alden et al. | 219/401 |

Primary Examiner—Randall L. Green
Attorney, Agent, or Firm—Herbert E. Messenger

[57] ABSTRACT

A compact steam cooking unit includes a compartment for holding fresh or frozen food to be cooked by steam and an associated gas-fired generator of steam which are combined in a fully self-contained appliance which requires only conventional utility connections and can be mounted on a counter-top. The steam generator includes a powered burner firing into one or more fire tubes which are submerged in water which is maintained at a desired level in a water chamber. Steam derived from heating of the water passes from the water chamber through ports into the cooking compartment where it contacts the food to be cooked.

6 Claims, 5 Drawing Figures

GAS-FIRED STEAM COOKER

BACKGROUND OF THE INVENTION

Cooking food with steam has long been recognized as a process which is not only efficient in terms of energy consumption, but which has the additional benefit of relatively low removal of nutrients from the food. Because available steam cooking systems have tended to be rather large and complex, steam cooking has for the most part been limited to high volume operations such as institutional cooking.

More recently, there has been increasing interest in steam cooking in restaurant applications. Steam cooking is particularly useful when frozen foods are involved, because it is entirely practical to have several different foods in a single container in which they may be cooked and also served to the customer. In response to this market, some equipment has been devised which is relatively compact, steam being generated by electric heaters and the entire apparatus being of a size small enough to serve as as a counter-top appliance. Because steam generation with electrical heating is a relatively slow and expensive process, however, alternative energy sources have come under consideration.

One obvious alternative energy source is gas, which is usually available in restaurants and institutions. However, available gas-fired equipment for generating steam is simply too large and cumbersome for use in steam cookers of a size that would be commercially acceptable. Moreover, the thought of a gas-fired steam cooker small enough to serve as a counter-top appliance has been dismissed as wholly impractical.

SUMMARY OF THE INVENTION

The present invention is concerned with a practical, gas-fired, compact steam cooking counter-top appliance which is fuel-efficient and commercially competitive with available electrical equipment. This objective is achieved by utilizing a novel heat transfer system which includes fire tubes immersed in water in such a fashion that steam is generated rapidly and efficiently and passed, as by convection, into a steamer or cooking compartment containing the fresh or frozen food to be cooked. A power burner assembly, preferably having an adjustable air intake and a burner, such as a ceramic or ribbon-type burner, fires into one or more of the fire tubes, each of which is lined with radial fins over which the hot gases and products of combustion flow.

Each fire tube may include several sections or clusters of radial fins, the fins of each section being angularly offset from adjacent sections to provide a tortuous path for the burner output.

The water from which steam is generated is contained in a chamber and maintained at a constant level to keep the fire tubes submerged by suitable controls on incoming water. The incoming water may also be preheated by passing it about the exhaust flue through which output waste gases are discharged.

In one embodiment of the heat transfer system, a baffle is positioned at the top of the water chamber to prevent water from reaching the outlet through which steam is passed to the cooking compartment. The cooking compartment itself may be surrounded by steam ports through which steam passes by pressureless convection to reach the food to be cooked. The burner is cycled on and off upon demand, and condensate and melted ice are drained continuously from the cooking compartment during operation of the steamer. Low-water sensors are employed to disable the burner in the event that insufficient water is available in the water chamber.

For a better understanding of the present invention, together with other objects, features, and advantages, there follows a description of the preferred embodiments, which should be read with reference to the following drawing, in which:

DESCRIPTION OF THE PREFERRED EMBODIMENT

Figure 1:
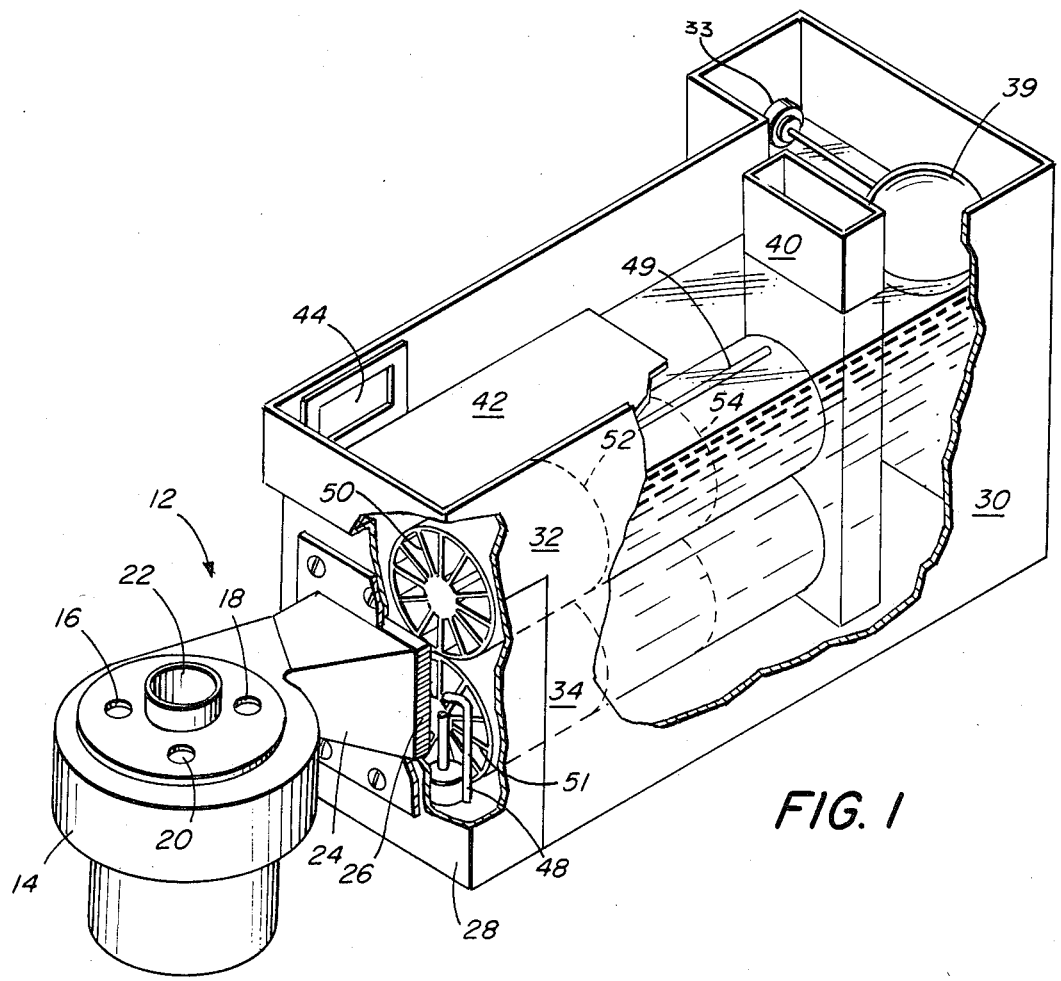
FIG. 1 is a perspective view of a preferred steam generator of the present invention.

In FIG. 1, there is shown a gas-air burner assembly 12 which includes a blower 14 and adjustable air intakes, of which intakes 16, 18 and 20 may be seen. A gas inlet 22 is disposed centrally of the blower 14 and accommodates a gas supply at fixed pressure.

The burner assembly has a flared transition 24 which terminates in a burner 26 which is sealed within the wall 28 of a water chamber 30. The burner 26, which may be a perforated ceramic burner or a ribbon-type burner, communicates with fire tubes 32 and 34 which are submerged in water. The water is maintained at a height sufficient to immerse the fire tubes at all times by means of an inlet 33 having a control such as the water level float 39. Other controls of an electric or electronic type might alternatively be used.

Figure 2:
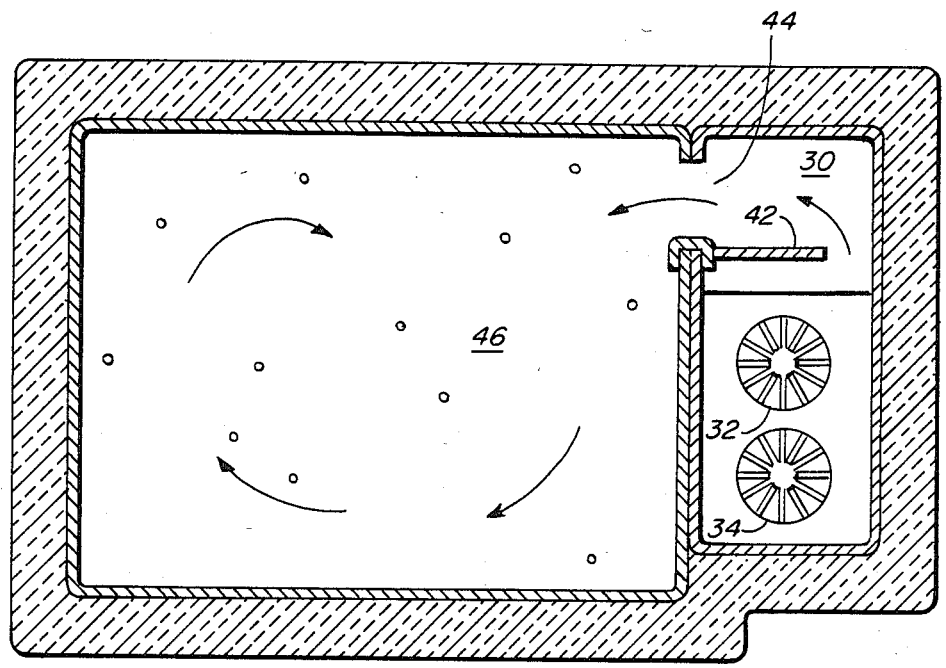
FIG. 2 is a sectional elevation of a steam cooker utilizing the steam generator illustrated in FIG. 1.

The fire tubes 32 and 34 terminate at their ends opposite the burner 26 into a generally rectangular exhaust flue 40, which may be connected to a suitable external vent (not shown). The exhaust flue 40 is narrower than the interior width of the chamber 30 to permit flow of water around it from the inlet. Mounted above the level of the water is a generally horizontal splash or baffle plate 42 which prevents water from reaching a steam outlet 44. The steam outlet 44 communicates with a cooking compartment 46, not shown in FIG. 1, but which is illustrated in the sectional view of FIG. 2.

Adjacent the burner 26 is a spark igniter 48 which is energized simultaneously with the blower 14. On the upper portion of the fire tube 32 is a low-water sensor 49, which disables the burner 26 should the level of the water fall to a point lower than the top of the fire tube 32. As indicated, incoming water passes about the exhaust flue 40 and is preheated to some extent in that fashion. More efficient preheating may be had by surrounding the exhaust flue with a coil through which incoming water flows.

Figure 3A:
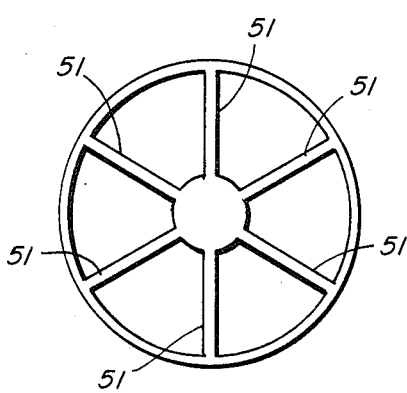
FIGS. 3(a) and 3(b) are cross-sections of fire tubes of the steam generator.
Figure 3B:
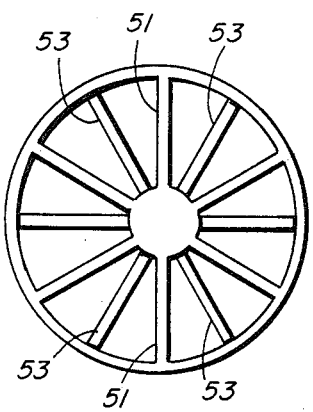

The fire tubes 32 and 34 contain radial fins as further shown in FIGS. 3(a) and 3(b). Hot gases emanating from the burner 26 impinge upon the fins, enhancing the transfer of heat from those gases to the walls of the fire tube and thence to the water.

Each of the fire tubes 32 and 34 preferably contains three sections or clusters of fins whose axial extent is indicated by the dotted lines 52 and 54. The first section of fins 51 as seen in FIG. 1, is preferably followed by a second section of fins which are spaced and angularly offset from those of the first section by an angle equal to half that between adjacent fins of the second section. This is illustrated in FIGS. 3(a) and 3(b), FIG. 3(a) showing the fins 51 of a typical first section and FIG. 3(b) showing the fins 51 plus the offset fins 53 of a typical section. (Note, however that although a total of twelve radial fins are shown in FIG. 1, for purposes of clarity only six fins 51 and 53 are shown in FIGS. 3(a) and 3(b). The fins of the third section are angularly disposed identically to the fins 51 of the first section. In this fashion, a tortuous path through each of the fire tubes is formed. In a typical fire tube of about 9" in length, each fin section may be about 2 ⅝" long with an axial separation between adjacent sections of about ⅜".

It is important for efficient heating of the fire tubes 32,34 that good contact be maintained between the fins and the inner wall of the fire tubes during operation of the steam cooker of the invention. Good contact may be assured by forming the tubes and fins as an integral structure, as by casting, or by welding the fins to the inner wall of the tubes. Both of these methods, however, may be rather costly.

A preferred method of assuring intimate contact between fins and tubes is to form the fins with diameters closely matching, or slightly larger than, those of the inner diameter of the fire tubes, and then to "shrink fit" the tubes over the fins. This may be accomplished by heating the tubes (and, if necessary, cooling the fins) sufficiently to permit the tubes to be slipped over the fins, then allowing the tubes to cool (and fins to warm) to room temperature, thereby contracting to provide a tight fit. Intimate contact during operation is further assured by selection of materials with appropriate coefficients of expansion. For example, use of stainless steel for the tubes and low carbon steel of somewhat greater coefficient of expansion results in enhanced contact between fins and tubes during burner operation.

Tests have been conducted of a steamer of the type illustrated in FIGS. 1, 2, 3(a), and 3(b) and utilizing natural gas as fuel for a ceramic burner. At a burner firing rate of about 34,000 BTU/hour (power equivalent of about eight kilowatts), cooking efficiencies of greater than 75 percent and flue losses of less than 20 percent were attained.

Figure 4:
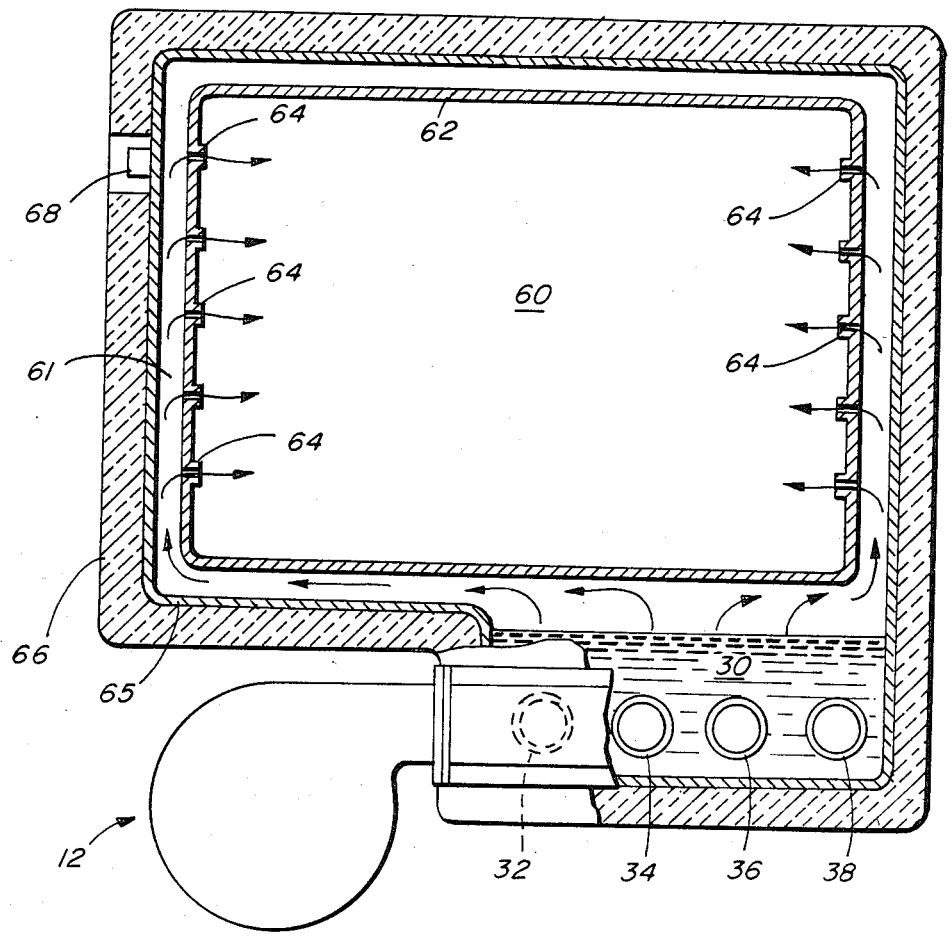
FIG. 4 is a sectional elevation of an alternate form of steam cooker.

In FIG. 4, there is shown an alternate embodiment of the self-contained steam cooker or steamer having a steam generator mounted below a cooking compartment 60. In this arrangement, the burner assembly 12 fires into a plurality of fire tubes 32, 34, 36, and 38 submerged in water of a water chamber 30 and having interior fins of the type described and shown in FIGS. 1, 2, 3(a) and 3(b). The tubes may be serially connected or placed in parallel to receive the hot gases from the burner assembly 12. If a parallel arrangement is utilized as illustrated in FIG. 4, the burner of this assembly may extend across the mouths of all of the fire tubes and may be of the ribbon type.

Steam generated in the water chamber 30 rises through the water and flows into a gap 61 formed between an inner wall 62 defining a cooking compartment 60 and an outer wall 65 which in turn is surrounded by an insulated jacket 66. The steam then passes by convection through openings 64 in the sides of the wall 62 into the cooking compartment 60.

As shown in FIG. 4, the steamer preferably includes a thermostat such as the thermostat 68 mounted in the wall 65 and which may be connected to control the operation of the burner assembly 12 in accordance with cooking requirements. The cooker may be operated cyclically, with its burner being shut off at the end of each cycle. Condensate, and any water melted from foods during cooking, may be drained from the cooking compartment on a continuous basis during operation of the steamer. Also to remove and prevent further accumulation of mineral deposits in the steam generator, water is preferably drained or discharged from the water chamber 30 when power to the steamer is shut off.

While the self-contained steamer of the invention has been shown and described as delivering steam by convection only, it should be apparent that the steamer may, if desired, readily be modified for delivery and use of steam at elevated pressures.

What is claimed is:

1. A self-contained, compact steamer comprising a compartment for containing food to be cooked by steam, a powered combustion system for generating heated products of combustion, a water chamber, means for maintaining a quantity of water at a predetermined level in said water chamber, at least one tube into which said heated products of combustion are directed, said tube being submerged in said water chamber whereby said water is converted to steam, an exhaust flue for carrying away said products of combustion after their passage through said tube, at least one outlet for steam being formed in said water chamber above said predetermined level, said outlet being in communication with said compartment whereby said food is cooked by said steam.

2. A steamer as defined in claim 1 wherein radial fins are disposed in each of said tubes and portions of said fins are in contact with the inner walls of said tubes to enhance the transfer of heat from said products of combustion to said water in said chamber.

3. A steamer as defined in claim 2 wherein said tubes are formed of stainless steel and said fins are formed of a steel having a greater coefficient of expansion then said tubes whereby contact between said tubes and fins is enhanced during operation of said burner.

4. A steamer as defined in claim 2 wherein each of said fins includes a plurality of sections, successive sections along the length of said tubes being angularly offset from each other whereby said products of combustion follow a tortuous path from said burner to said exhaust flue.

5. A steamer as defined in claim 1 wherein said compartment includes an inner wall and an outer wall, a passage being formed between said walls, said outer wall having at least an opening formed therein and communicating with said water chamber through said outlet for steam, and said inner wall having a plurality of openings formed therethrough whereby steam may be distributed within said compartment to cook said food.

6. A steamer as defined in claim 4 wherein said means for maintaining a quantity of water at a predetermined level in said water chamber includes a water inlet, and said exhaust flue is immersed in water in said water chamber between said water inlet and said tubes and extends across a portion of the water chamber whereby water input to said water chamber is preheated by said exhaust flue.

* * * * *